(12) United States Patent
Liu

(10) Patent No.: US 12,088,757 B1
(45) Date of Patent: Sep. 10, 2024

(54) CLIENT-SPECIFIC CONTROL OF SHARED TELECOMMUNICATIONS SERVICES

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 18/211,998

(22) Filed: Jun. 20, 2023

Related U.S. Application Data

(63) Continuation of application No. 17/670,851, filed on Feb. 14, 2022, now Pat. No. 11,689,657, which is a continuation of application No. 16/867,139, filed on May 5, 2020, now Pat. No. 11,252,276, which is a continuation of application No. 16/195,443, filed on Nov. 19, 2018, now Pat. No. 10,645,217, which is a continuation of application No. 15/240,457, filed on Aug. 18, 2016, now Pat. No. 10,135,974.

(60) Provisional application No. 62/353,977, filed on Jun. 23, 2016.

(51) Int. Cl.
| | |
|---|---|
| *H04L 12/28* | (2006.01) |
| *H04L 41/5051* | (2022.01) |
| *H04M 3/42* | (2006.01) |
| *H04M 7/00* | (2006.01) |

(52) U.S. Cl.
CPC .... *H04M 3/42161* (2013.01); *H04L 41/5051* (2013.01); *H04M 3/42323* (2013.01); *H04M 7/0087* (2013.01)

(58) Field of Classification Search
CPC ......... H04M 3/42161; H04M 3/42323; H04M 7/0087; H04L 41/5051; H04L 12/42; H04L 12/437; H04L 41/12; H04L 45/02; H04L 12/4637

See application file for complete search history.

(56) References Cited

U.S. PATENT DOCUMENTS

| | | | |
|---|---|---|---|
| 6,920,441 B2 | 7/2005 | Zyarko et al. | |
| 6,922,411 B1 | 7/2005 | Taylor | |
| 6,985,478 B2 | 1/2006 | Pogossiants et al. | |
| 8,018,921 B2 | 9/2011 | Pogossiants et al. | |
| 9,553,755 B2 | 1/2017 | Anisimov et al. | |
| 2002/0035622 A1* | 3/2002 | Barber | G06Q 30/0255 709/219 |
| 2013/0212214 A1* | 8/2013 | Lawson | H04L 67/12 709/217 |

(Continued)

OTHER PUBLICATIONS

USPTO Notice of Allowance dated Jun. 23, 2023, received for U.S. Appl. No. 17/878,571 of the instant Applicant/Assignee, 9 pages.

*Primary Examiner* — Phuongchau Ba Nguyen
(74) *Attorney, Agent, or Firm* — Crawford Maunu PLLC

(57) ABSTRACT

Aspects are directed toward use of data communications server(s) and a Platform as a Service (PaaS) interface to provide remote services for endpoint devices of a plurality disparate client entities. In one example, an apparatus includes a computing server to provide data communications for a plurality of endpoint devices respectively associated with a plurality of disparate client entities according to and responsive to client-specific sets of control data. The apparatus also includes a processing circuit configured to adjust routing of the communications by the computing server, in response to call event data generated by the computing server, by generating the client-specific sets of control data for each client entity according to a respective set of directives.

20 Claims, 6 Drawing Sheets

(56) References Cited

U.S. PATENT DOCUMENTS

2017/0093700 A1\* 3/2017 Gilley ................... H04L 45/44

\* cited by examiner

CLIENT-SPECIFIC CONTROL OF SHARED TELECOMMUNICATIONS SERVICES

OVERVIEW

Voice over Internet Protocol (VOIP) and other data-communications platforms have allowed individuals to make telephone calls using broadband Internet connections in place of traditional telephone lines. For example, a VoIP endpoint device can use a broadband Internet connection to connect to a VoIP or data-communications server that is managed by a VoIP service provider. The data-communications server can handle call routing and provide other data-communications services for the (user) endpoint device.

Some data-communications providers customize their services for different customers. This might include customizable auto attendants, call routing, call forwarding, voicemail, or other features. For particularly large clients with many different telephone accounts and numbers, implementing and updating these types of customizations can be a significant undertaking.

SUMMARY

Various example embodiments are directed to issues such as those addressed above and/or others which may become apparent from the following disclosure concerning systems and methods for providing remote services for endpoints.

In one example, an apparatus includes a data-communications communications server having call-routing logic. The call-routing logic is configured to provide voice-based data communications and/or other data communications by providing call extensions for a plurality of customer accounts supported by the data-communications service platform routing calls for the provided call extensions. The data-communications server also includes a call control engine configured to control calls routed by the server. The call control engine may control the calls for each respective customer account, for example, by receiving telephone calls made to the customer account, parsing a respective set of one or more documents for the customer account in response to the telephone calls, accessing a customer server that provides data for the telephone calls based upon the parsing of the documents, processing conditional statements that are responsive to the provided data, and generating routing instructions in response to the conditional statements and associated call flow commands. The parsed documents are written in a programming language that includes call flow commands for the call routing logic. The routing instructions generated by the call control engine are not included in the programming language.

In another example embodiment, a method for providing a data-communications service platform to customers is disclosed. Using call routing logic of a data-communications server of the data-communications system call extensions are provided for customer accounts supported by the service platform. Using a call control engine of the server telephone calls made to a customer are received and, in response to the telephone calls, a set of one or more documents written in a programming language are parsed. The programming language includes call flow commands for the call routing logic. Using the call control engine, a customer server that provides data for the telephone calls is accessed based upon the parsing of the documents. Conditional statements that are responsive to the retrieved data are processed using the call control engine. In response to the conditional statements and associated call flow commands written in the programming language, routing instructions for the call routing logic are generated using the call control engine.

The above discussion/summary is not intended to describe each embodiment or every implementation of the present disclosure.

BRIEF DESCRIPTION OF THE FIGURES

The disclosure may be more completely understood in consideration of the following detailed description of various embodiments of the disclosure, in connection with the accompanying drawings in which.

Figure 1:
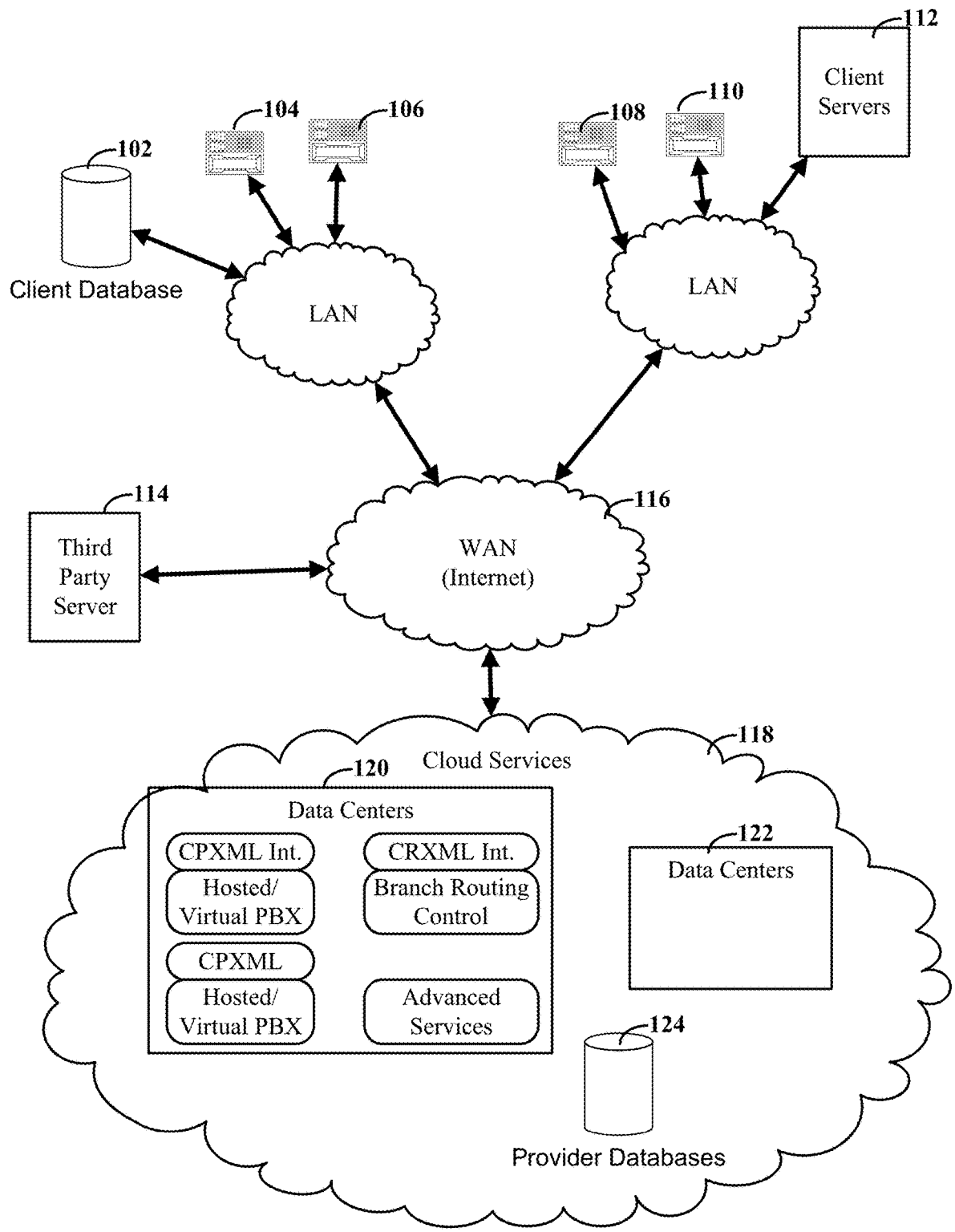
FIG. 1 is a diagram for a system that uses a high-level programming language for call control operations, consistent with embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods relating to communication systems. Various embodiments of the present disclosure are directed towards components that can be used for providing VoIP systems as a Platform as a Service (PaaS). The PaaS can provide a platform for customers to implement VoIP telephone services that are useful for VoIP-capable endpoint devices (sometimes referred to simply as an "endpoint" or a "VoIP endpoint"). While the disclosure is not necessarily limited to VoIP systems, platform and/or services, VOIP systems as a PaaS is used in the following discussion to exemplify certain specific advantageous embodiments.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination.

While the present disclosure is not necessarily limited to such embodiments, certain embodiments are disclosed and/or illustrated in connection with cloud-based data centers that provide a PaaS that is built upon a system that provides VoIP telephone service. Various embodiments are directed to VoIP telephone service that includes a private branch exchange (PBX). A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide Direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to embodiments, a PaaS can provide a user with access to, among other things, telephone call routing control, PBX functions, computer telephony integration (CTI), and data analytics. Embodiments of the present disclosure are directed toward an interface that allows users of the PaaS solution to access VoIP telephone capabilities of the underlying system, including its hardware and software components, while maintaining the integrity and security of the underlying system. Particular embodiments are directed toward a PaaS solution that allows for VoIP call flow control to be controlled, while also providing the ability to interface with data sources that are either part of the underlying system or external to the PaaS solution.

The ability to access the underlying VOIP services, including call routing and call control engines, can provide a platform that is both flexible and simple to implement from the viewpoints of both the VOIP provider and the customers of the VOIP provider. The PaaS solution can be configured to modify and control the call flow and processing at all levels within the system, including (re)routing of incoming calls to different PBXs. When compared to an add-on type service where a call is first handled by a separate PBX, the PaaS solution may offer a number of advantages and additional features including, but not limited to, increased call routing capabilities, scalability, and reduced complexity. For instance, access to PBX functions allows for simple call redirection to extensions or DID numbers provided by the PBX. Moreover, the PaaS solution coordinates and routes calls between multiple PBXs using an initial call routing switch. Calls initially routed to a particular PBX can still be rerouted to a different PBX using the initial call routing switch.

The VOIP servers providing the underlying function for the PaaS can be configured to utilize a high-level, domain-specific programming language. A particular example language is referred to as Call Processing extensible Markup Language (CPXML). CPXML refers to a call processing language which defines the message exchange protocol between a call control server (e.g., an IntraSwitch with a CPXML Engine) and other sources of information, such as databases, web applications, authentication servers, and servers providing various call-related services. CPXML can allow developers to program call processing logic or service execution logic with both XML building blocks and JavaScript/TCL, or other scripting languages. In certain implementations, CPXML allows PaaS customer developers to program and integrate VOIP call flow (e.g., as provided by a cloud-based VOIP service) with customer or third party application servers and databases.

According to particular embodiments, a CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, call control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the VoIP server provider's cloud database). This information can then be used to drive call flow or call control decisions.

According to various embodiments, the high-level programming language allows a programmer access to the PaaS solution by way of a controlled and limited set of call control operations and functions. The limitations on the operations can be particularly useful for allowing programming control to be placed into the hands of different customers of the provider of the VOIP servers. For example, the provider can update or make other changes to how the VOIP servers are configured without requiring modification to documents written to use the high-level language, which might otherwise be required to account for the changes. Moreover, the VOIP servers and their data can be protected from poor programming decisions (intentional or otherwise) by tightly controlling the extent that the documents provide control of or access to the inner workings of the VOIP servers.

In various embodiments, the high-level programming language and the VOIP servers that execute the high-level programming language can be configured to interface with other sources of data and control. This can include, for example, flow control decisions that are based upon code running on the client side or on the server side. As non-limiting examples, a client side computer system could run code that is written using JavaScript or TCL while a server-side computer system might run code that is written using PHP, NodeJS, Python, Scala, Ruby, .Net, or other web languages. For example, a customer can write JavaScript applications that are configured to receive call event notifications from the VOIP servers and to generate XML responses that are provided back to the VOIP servers. In some instances, the code can be configured to dynamically modify the XML content of the documents for each call instance.

In some embodiments, the high-level programming language can include commands that allow queries be sent to various databases, whether the database is controlled by the client or VOIP provider. The high-level programming language can also allow for calls to web-based (e.g., HTML) servers or to application programming interfaces (APIs) of the VOIP provider or client.

Consistent with certain embodiments, the call control engine and high-level programming language provide interface options that allow for authorization and authentication services to be accessed and used as part of the call control functions. For example, the high-level programming language can be used to direct the call control engine to access an authentication server that performs verification (and grant) of access rights for certain databases or services.

According to embodiments of the present disclosure, the VOIP servers can be configured to use different high-level programming languages for different functions, where each programming language has a different set of commands. For example, a first high-level programming language can be used to create documents that control call routing decisions for high volumes of call traffic, as might occur at the edge of a VoIP provider's system. These call routing decisions can, for example, identify a particular branch office or an PBX of a particular customer. The identified PBX might then have additional documents written to communicate using a second high-level programming language that is tailored toward more specific call processing capabilities that might be associated with a particular account or another identifiable grouping. The distinction between the two programming languages can be particularly useful in terms of improving the scalability of the system. For instance, the language used for call routing decisions can be relatively light weight, with fewer commands and capabilities. In particular implementations, the first (call routing) language can contain a subset of the commands available in the second (call processing) language.

Various embodiments of the present disclosure are directed toward VOIP servers that are designed to provide options for dynamically updating and accessing documents using the high-level programming language. For instance, the VoIP servers can be configured to facilitate uploading of new documents as desired by a customer using an interface to the system. The interface can be configured, as an example, to allow a customer to login and replace or modify the existing documents.

Consistent with certain embodiments, the VOIP servers can be configured to allow for complex hierarchal solutions that can improve scalability of the system. For example, call control decisions that are shared between certain groups of accounts can share a common template document that can be updated once for all of the groups. The shared document can link to other documents that are specifically tailored to individual accounts in order to provide individual customizable options. Consistent with some embodiments, there can be multiple levels of shared documents and scripts. For example, a first template document might specify call processing functionality for an entire company. A second set of template documents could be used at a country level (e.g., one template document for the United States and one template document for Canada). A third set of template documents could then be used for each branch or store of the company. Finally, individual documents could be used for each individual account. The shared, higher-level files can be updated once for a potentially large number of individual accounts, while still providing a level of individual configurability for each of the accounts.

According to various embodiments, the high-level, domain-specific programming language(s) is (are) defined using a markup language as the basis for the language structure. More particular embodiments use extensible markup language (XML). An XML model defines the constraints on the high-level language, including defining the set of valid commands that can be carried out by the VOIP servers. Within these constraints, a customer can write XML code that self-describes the building blocks used in the customer's particular application. Another aspect of the call processing XML allow for various different data structures to be embedded into the XML document or file. For example, a script written in JavaScript can be embedded as character data that the VoIP servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial call routing and the other for providing more complex and specific call processing functions. In various portions of the present disclosure, the two languages are referred to as either call processing XML (CPXML) or call routing XML (CRXML).

Turning now to the figures, FIG. 1 is a diagram for a system that uses a high-level programming language for call control operations, consistent with embodiments of the present disclosure. In connection with these specifically-illustrated examples, VOIP endpoint devices 104, 106, 108, and 110 are configured to place and receive VoIP telephone calls between other VOIP endpoint devices, and also between non-VoIP endpoint devices (not depicted). The depicted examples of non-VOIP endpoint devices include plain old telephone service (POTS) telephones and cellular-capable devices, which might also be VoIP capable (e.g., smart phones with appropriate VoIP software applications). The various endpoint devices include circuitry that is specially configured to provide calling functions that include interfacing with the appropriate circuitry of the call service provider used by the corresponding endpoint device. In many contexts a VoIP-endpoint device is a VoIP-capable telephone commonly referred to as IP phones. The VoIP-endpoint devices can include, but are not limited to, desktop computers, mobile (smart) phones, laptop computers, and tablets. When each of the endpoint devices originates or receives a call in a telephone network, each can be characterized or referred to as an addressable call endpoint or a dial peer.

The call routing and other services for the VoIP telephone calls can be provided by one or more VOIP servers within the cloud base system 118 (e.g., configured to provide a PaaS to customers of the VOIP provider). In particular example embodiments, the VOIP servers can be located within one or more data centers 120, 122, which are part of a cloud services system 118. The data centers can be, for example, part of a cloud-based system 118 where the hardware providing the cloud services is located in a number of different data centers with different physical locations. Consistent with embodiments, the cloud services can include SIP servers, media servers, and servers providing other services to both VOIP endpoint devices and the users of the VOIP endpoint devices. In some instances, the various servers, including both the VOIP Servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a VOIP server uses session initiation protocol (SIP) to handle various call functions (e.g., call setup and tear down); however, the various embodiments discussed herein are not necessarily limited thereto. Consistent with the above and other embodiments disclosed herein, the VoIP servers can be configured to establish a leg of the call from the VoIP endpoint devices (or dial peers) to another VoIP endpoint device, or to a gateway.

According to various embodiments, one or more data analytics servers can monitor and analyze call data relating to the VoIP servers and VoIP endpoint devices. For example, a data analytics server can be designed to track call statistics about various different call-related parameters, such as call duration, call date, call time of day, called parties, endpoint devices, selected data centers, selected carriers, dropped calls, transferred calls, voicemail access, conferencing features, and others. The high-level programming language(s) and the VOIP servers executing the languages can access the call summary metrics and the data analytics, which can be stored in a provider database 124. For example, a script running the VOIP server could parse CPXML documents to generate database queries that direct the VoIP server to query, or subscribe to, call length summaries for all calls made to endpoints that are registered with the VOIP server. The script could then use the information to control how calls are routed as well as how different (customer or provider) services are invoked. According to various embodiments, the database queries could be sent to a customer database 102.

Consistent with certain embodiments, the VOIP server can be configured to interface with customer servers 112 or even with third party servers 114. For instance, a CPXML document stored by the cloud-based system 118 can identify, based upon a received call, a Uniform Resource Identifier (URI) that points to customer servers 112 or to a third party server 114. Data provided from these servers, e.g., in the form of a CPXML document can be used to specify call routing, or other functions.

Figure 2:
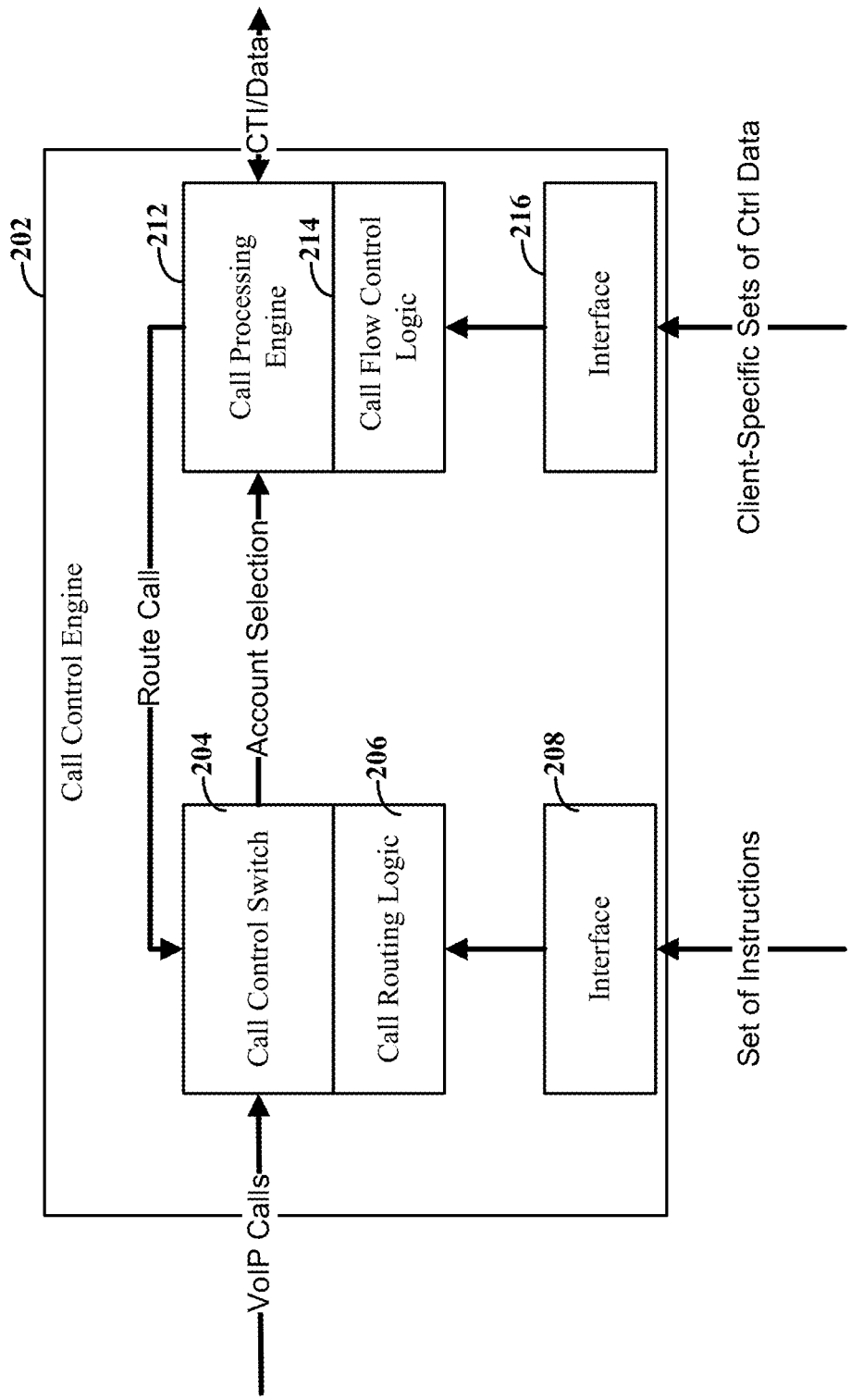
FIG. 2 is a block diagram of a call control engine with high-level programmable language logic for two different languages, consistent with embodiments of the present disclosure.

FIG. 2 is a block diagram of a call control engine with high-level programmable language logic for two different languages, consistent with embodiments of the present disclosure. When an incoming call is received by the call control engine 202, the call can first be handled by a call control switch 204. The call control switch 204 can be configured to receive and process a first document that defines how the call is subsequently routed. As discussed herein, this document can be written in a first programming language, CRXML, which provides limited access to the call routing control logic of the call control switch 204. CRXML documents can be provided by a customer through a CRXML interface 208, which provides CRXML documents to a call routing logic plugin 206. The CRXML call routing control logic 206 can parse and execute the CRXML documents while providing a controlled access to the functions of the call control switch 204.

According to various embodiments of the present disclosure, CRXML defines a limited set of commands to the call routing logic that allows a customer to define how a call is initially routed. Maintaining the CRXML as a limited set of simple building block commands can help with the efficiency of the call control switch. For example, the call control switch 204 can be located at the perimeter of the VOIP provider's routing network, which implies that it may be required to handle a large volume of VoIP telephone calls. The efficiency in processing the large volume of calls can have a significant impact on the performance of the system.

Consistent with various embodiments, the CRXML documents specify a first level of call routing and simple call processing that are carried out by the call control switch 204. For example, a call control switch 204 may provide call routing options for multiple branch offices or locations and for multiple PBXs that support the branch locations. Each branch and PBX may have multiple customer (user) accounts associated therewith. CRXML documents can be used to determine the routing for a call by identifying a particular branch location, a particular PBX and particular VoIP customer account to use in subsequent call processing and routing. The initial routing decision is indicated by the arrow labelled as "account selection," which shows the passage of control to a call processing engine 212.

The call processing engine 212 can be configured to identify and execute additional documents that can be selected based upon the identified account, or upon similar identifying information, as provided by the call control switch 204. As discussed herein, these documents can be written in a second programming language, CPXML, which provides access to the call flow control logic of the call processing engine 212. In certain embodiments, the second programming language, CPXML, can include commands that support contextual call routing and advanced call services. The CPXML documents can be provided by a customer using a CPXML interface 216, which provides received CPXML documents to a CPXML call flow control logic 214. In particular implementations, the interface 216 is configured to allow a customer to upload new CPXML documents to a database 124 maintained by the VOIP provider. For each incoming call, the VoIP provider can select the appropriate CPXML document(s). For instance, the VOIP provider database can be organized by customer. Each customer might also have further organizational breakdowns relative to different CPXML documents, such as by having different CPXML documents for different branches, stores, countries, or combinations thereof.

The interface 216 can also be configured to allow CPXML documents to be retrieved from a customer-managed location. For instance, the customer can provide a base CPXML document that includes a URI to a customer server. The customer server can then provide CPXML document(s) on an as needed basis for each call. The CPXML documents could be loaded directly from a customer database, or they might be dynamically generated based upon data that is specific to the particular call (e.g., the called party, the called party status, or the calling party identity), or to data from other inputs (e.g., a call queue status, a status of network outages, or the like).

The CPXML call flow control logic 214 can parse and execute the CPXML documents while providing a controlled access to the functions of the call processing engine 212. According to embodiments of the present disclosure, a CPXML document can be associated with a particular extension account (or group of extension accounts) and can be invoked when there is an incoming call routed to the extension account. The call processing engine 212 can determine whether or not the CPXML option has been enabled for the extension account. If enabled, the CPXML call flow control logic 214 can be called. Consistent with various embodiments of the present disclosure, the CPXML call flow control logic 214 and the CRXML call routing logic 206 are each implemented as plugin applications that interface with the call control engine according to their respective XML-defined parameters.

In certain embodiments, the call processing engine 212 can have the capability to provide feedback to the call control switch 204. For example, a CPXML document for a particular account may specify a condition that, if satisfied, routes a call to a different branch office. The call processing engine 212 is configurable, using one or more CPXML commands, to provide an indication of a new call route decision as feedback to the call control switch 204. The call control switch 204 can respond by overriding the prior call routing decision and rerouting the call. The corresponding routing decision may then go to a different call processing engine 212, which can handle the call according to a different CPXML document or the previously-used CPXML document using different data to drive the call processing and routing decisions.

Consistent with various embodiments, outbound calls, or calls originating from VOIP devices supported by the call control engine 202 and the corresponding PaaS implementation, can be routed using CPXML and the call processing engine 212.

Figure 3:
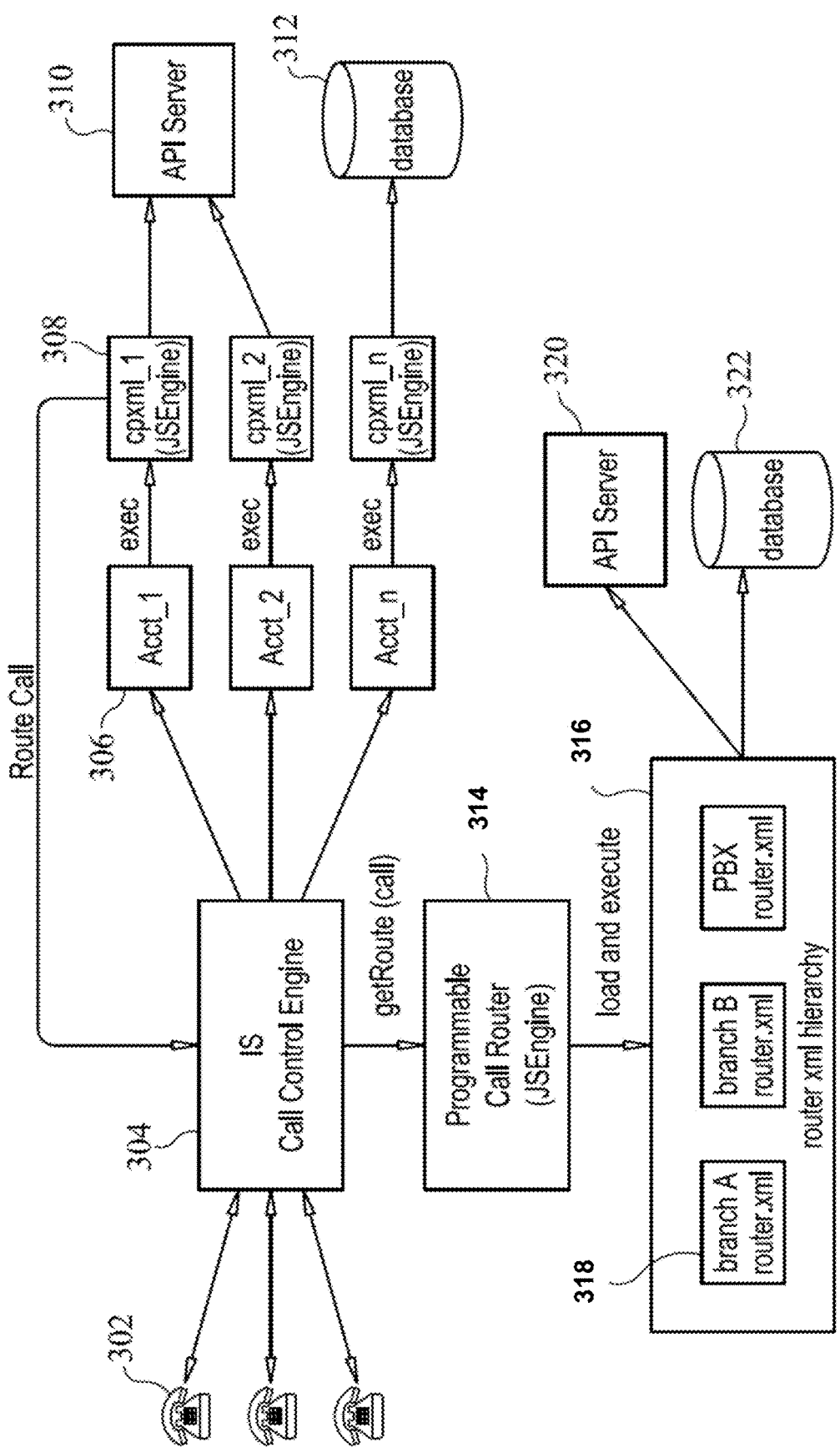
FIG. 3 is a block diagram showing a hierarchy of programmable language documents, consistent with embodiments of the present disclosure.

FIG. 3 is a block diagram showing the use of a hierarchy of programmable language documents, consistent with embodiments of the present disclosure. Call control engine 304 can provide call flow control and routing in a manner that can be consistent with discussions found herein and relating to call control engines, VOIP servers, and the other figures. Consistent with various embodiments, the call control engine 304 is an PBX that is part of a VOIP PaaS. For instance, the PBX can be configured using Java-based applications that manage voice over IP (VoIP) networks. The PBX can be hosted by a VoIP service provider and located at one or more data centers. Various PBX features can be provided, such as call forwarding, remote pickup, call routing, and voice mail.

Consistent with various embodiments, customers of a VOIP provider can use the VOIP PaaS by generating documents written in both CRXML and CPXML. Together, the documents specify how the customer would like call intercept to be handled for both inbound and outbound calls. For instance, a CPXML document 308 can be associated with an extension account 306, or with groups of extension accounts. The extension accounts 306 can represent a specific individual and their associated extension number(s). A CPXML document 308 that is configured in this manner will be invoked by the call control engine 304 after an incoming call is routed to an extension that has CPXML capabilities enabled. CPXML documents can also be used for call flow processing of outbound calls. The CPXML document may provide logic for sophisticated call flow call control functions for outbound calls. For example, messages (e.g. text messages and email messages) can be automatically generated in response to outgoing calls and restrictions can be placed on outbound calls based upon factors such as time of day or call history. Another CPXML function could be implementation of auto attendants that are each specific to the CRXML-specified routing decision.

The call control engine 304 may also consult with call routers 314. The call routers can be programmed using CRXML documents 318, and with JavaScript for dynamic data access and logic handling. The CRXML documents 318 can be arranged in router xml hierarchy 316, which can specify different CRXML documents 318 depending upon the branch or PBX that is identified as corresponding to the call. Once the call router documents are loaded, they can be cached in memory and used by the call control engine 304 to make a routing decision. When a call is routed through the call control engine 304, the call control engine can consult with high-level CRXML documents. The branch level can be identified, for example, based on the branch Id of caller (for outbound calls) or callee (for inbound calls). Delineations other than the branch are also possible, such as by the called country, the particular store, the state, or other. If a route result is not determined, the call control engine 304 can also consult with PBX-level CRXML document to obtain routing decisions. Examples of a route result from a script are "Accept", "Reject", or "NewRoute." Thus, the programmable call router (CRXML) module 314 provides the call control engine 304 with the ability to handle call intercept/filter reject or re-route the call to a different target destination.

The call router module 314 can also interact with a CPXML document to handle sophisticated call flow scenarios where the call routing is changed after the initial determination. For example, the CPXML can include commands (e.g., "reroute") that the call control engine 304 uses to provide feedback to the programmable call routers 314, which use CRXML for initial routing decisions. This might allow, as an example, a CRXML routing decision to be overridden by the CPXML document(s).

According to particular embodiments, the programmable call routers (using CRXML) 314 can be viewed as plugins to the call control engine 304. The call router plugins may have two levels—Branch and PBX levels. The call router supports CRXML-defined structures that specify how the PaaS can be utilized by a customer. For example, the CRXML can define sets of conditional statements, data access requests, and call routing commands: if/else, condition, goto, log, var, script, query, data, accept, reject, route statements, or other similar commands. In particular embodiments, CRXML can be considered a subset of CPXML by containing a part, but not all, of the CPXML call flow commands. This distinction can be useful for keeping CRXML documents light weight so that call routing decisions are simplified and efficient. More complex tasks, such as the use of media and advanced call handling, can be handled using CPXML. Using such programmable call routes, a few example uses include: school district that generates SMS/Email notifications to parents whenever an emergency number is dialed; off hour restriction of outbound call with CPXML; call center lockdown to provide outbound dialing restriction for phones; computer initiated dialing with caller identification (ID) override based destination database table, and call return to target DID/agents; and implementation of a call black list (denying calls to/from the list) or white list (allowing calls to/from the list) with potentially large lists and dynamic updating capabilities.

Consistent with embodiments of the present disclosure, both CRXML and CPXML provide the capability of handling dynamic data from multiple sources. Examples of these sources are depicted as application program interface servers 310, 320 and databases 312, 322. The dynamic data can therefore be provided from a variety of sources including, but not necessarily limited to, call route session data (caller id, callee id, or route from/to), query custom object (to a database) in the VoIP provider system/cloud, and access data through HTTP RESTful API. For instance, the XML documents can include a web resource that is identified by Uniform Resource Identifiers. The web resource might be a customer HTTP server that responds to a conditional query (e.g., whether or not a call queue is above a threshold) with CPXML code that instructs the call control engine on how to route, or otherwise handle, the call.

Figure 4:
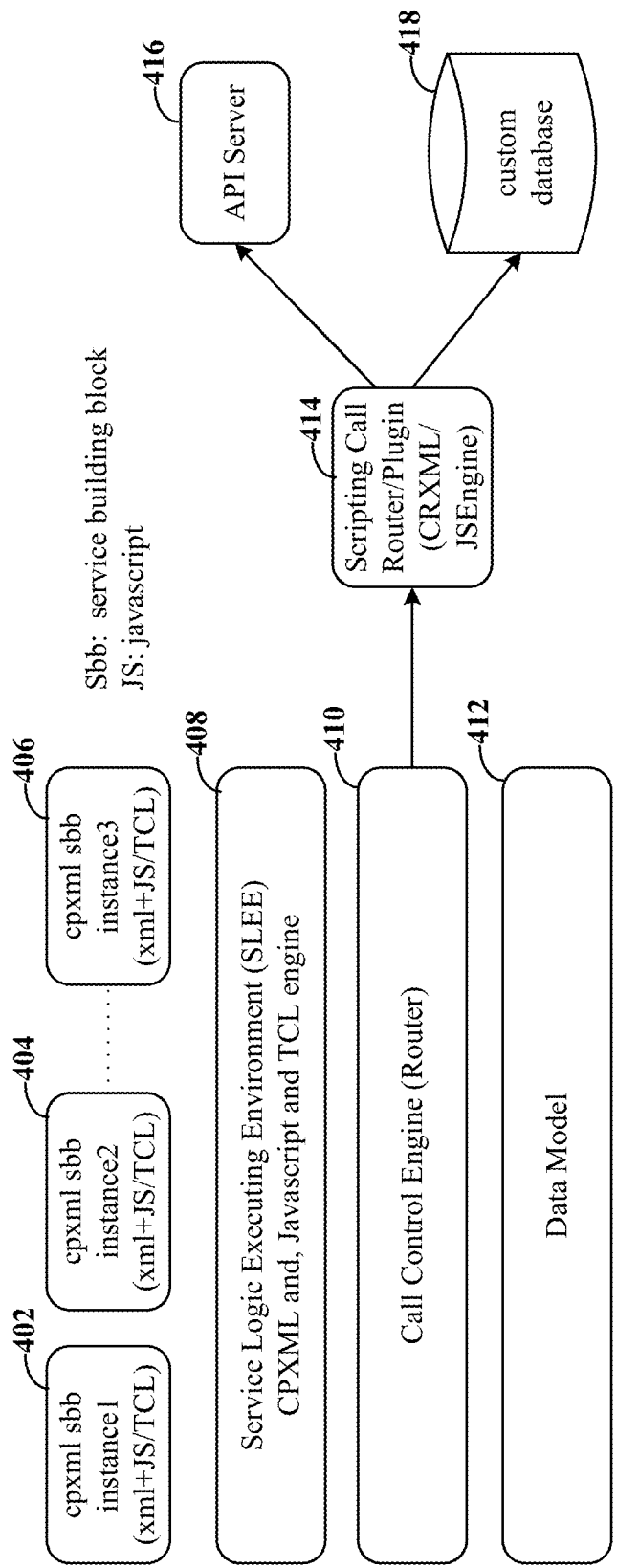
FIG. 4 is a block diagram that shows multiple conceptual layers in a call control system, consistent with embodiments of the present disclosure.

FIG. 4 is a block diagram that shows multiple conceptual layers in a call control system, consistent with embodiments of the present disclosure. The depicted configuration shows three sources of CPXML documents 402, 404, 406. The service logic executing environment 408 access and executes the CPXML documents 402, 404, 406. The CPXML documents can be embedded as part of other call flow solutions (e.g., as part of a CTI solution), loaded locally from each of the call control servers 410 or PBXs, or loaded from a remote web application server 416 (e.g., using with HTTP(s) protocol). The integration of the layers facilitates the ability of a developer to use the (iPBX) data model 412, provider-hosted database(s) 418, third-party application servers 416 and third-party database(s) 418 to drive business and call flow logic and to integrate telecommunication with other capabilities and services.

Figure 5:
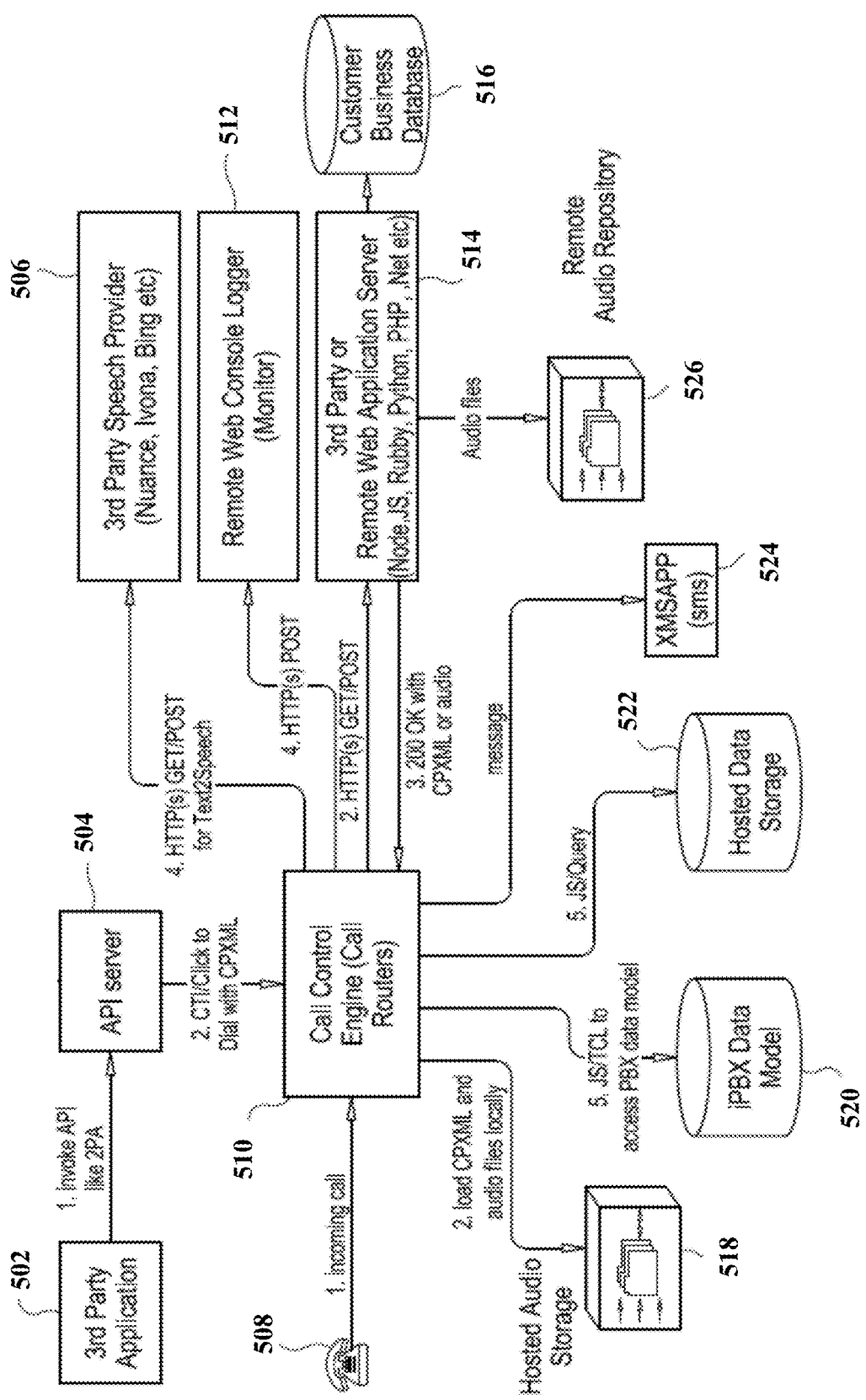
FIG. 5 is a block diagram showing interconnections to a call routing switch, consistent with embodiments of the present disclosure.

FIG. 5 is a block diagram showing interconnections to a call routing switch, consistent with embodiments of the present disclosure. As a particular, non-limiting example, an incoming call, from a telephone device 508, is received by the call control engine 510. The call control engine 510 can use the call destination to invoke a proper VOIP call services (e.g., CTI functionality), which in some instances can be provided by a third party application server 502 through a VoIP provider's API server 504. The CPXML documents can be embedded within the CTI service data. Alternatively, CPXML documents can be loaded from a database 522, which might be hosted by the VOIP provider as part of the PaaS solution. A third option is for the CPXML documents to be retrieved from a customer database 516. For example, the CPXML documents could be retrieved using an HTTP connection to a web application server 514. At the same time that the CPXML documents are retrieved, additional information can also be provided, such as audio files 518, 526. The audio files could be used for various purposes, such as for implementing an auto attendant feature.

In various embodiments, a customer can use databases and other data sources that are offered by the VOIP provider without having direct access to the data. Rather, the customer can use the CPXML to generate queries that identify a data source and a conditional response based upon the query results. The call control engine can carry out the conditional response based upon the results of the query without the customer every receiving, or otherwise having access to, the data driving the conditional response. A particular example might be a query to a call analytics database for the VoIP provider. A customer could be given the limited, indirect access to the database through CPXML-driven queries while the VOIP provider maintains control over the proprietary contents of the database. Moreover, the database might contain information about individual callers that would raise privacy concerns.

In some instances, the customer can provide the data sources to the VOIP provider and the call control engine without providing direct access to the data. For example, the customer can specify, in a CPXML document, a URI that points to a customer-provided server and an associated query. The customer-provided server can execute, for example, a local script that may rely upon customer data. The script can generate a response in the form of a CPXML document. The call control engine can then carry out call routing, or other functions, based upon the response and without ever having direct access to the customer data.

In certain embodiments, the call control engine 510 can provide call processing information to a monitor server 512 (e.g., a remote web consolelogger application). The call control engine 510 can then execute the CPXML documents. In an example implementation, the CPXML document might invoke various other services, such as a text-to-speech application 506. For example, a CPXML document might specify that a string of text be converted to speech using a corresponding command (e.g., "<say>Hello, please hold.</say>"). The CPXML document can also request access to various other data sources, such as PBX data model 520 and a hosted data storage 522. Further, the CPXML document can specify that an SMS/MMS text message be sent using XMSApp 524 or generate new calls (e.g., for call conferencing or call forking). The provided examples of capabilities using CPXML documents are not limiting.

Figure 6:
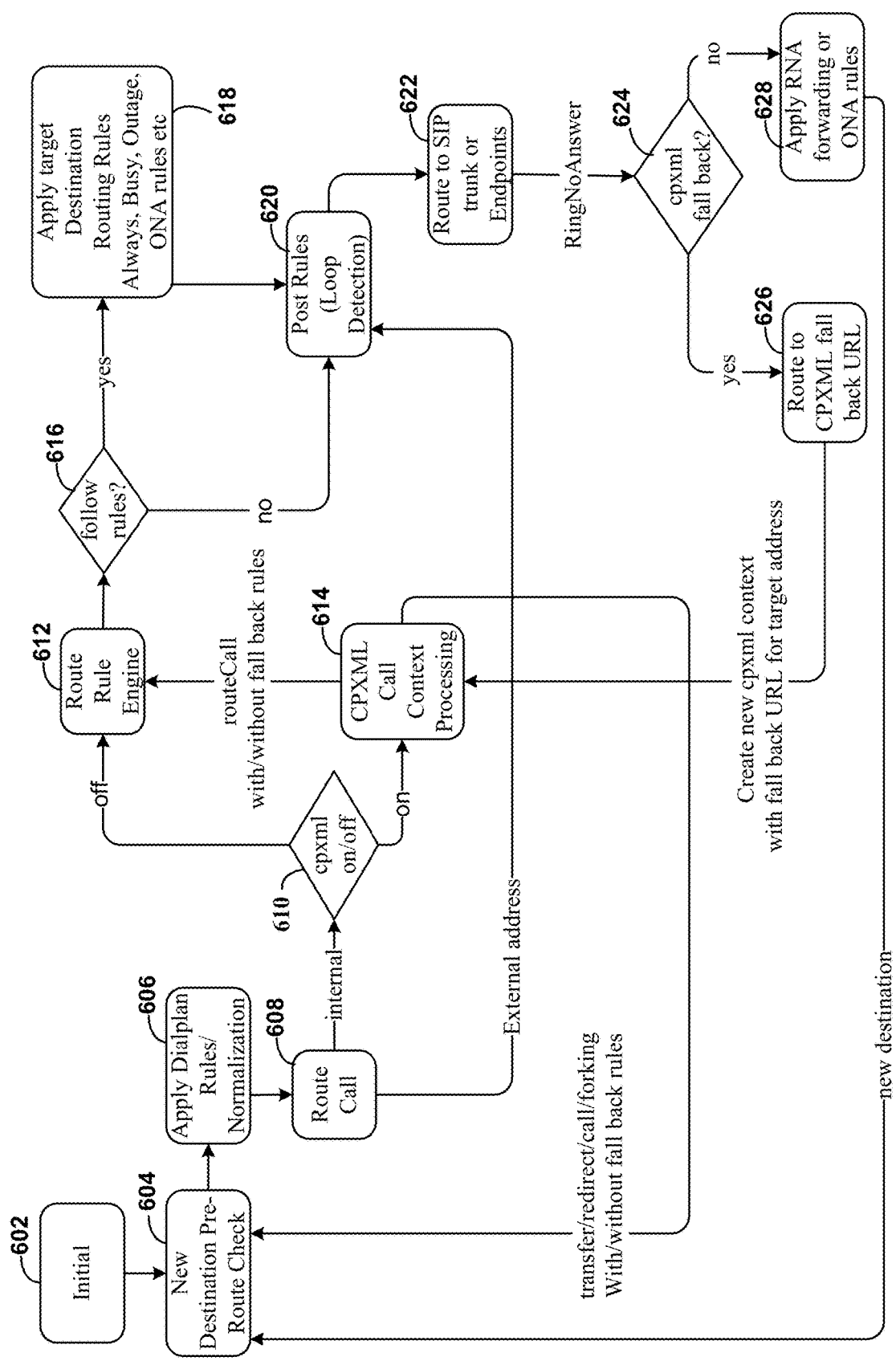
FIG. 6 is a flow diagram for a call routed by a call control engine, consistent with embodiments of the present disclosure.

FIG. 6 is a flow diagram for a call routed by a call control engine, consistent with embodiments of the present disclosure. At block 602 a call is initially received by a call control engine. The call control engine then can apply an initial dial plan to route the call, per block 608. Consistent with certain embodiments, the initial dial plan can indicate whether the call is routed within the VOIP provider's network or to an external (SIP) address or telephone number. If the call is routed externally, then the call control engine can implement post-call processing rules, per block 620. For instance, the call control engine can perform loop detection to prevent call loop conditions for call routing. The call control engine can then route the call to an SIP trunk or to particular endpoint devices, per block 622. If the call is not successfully connected or answered, then the call control engine can be configured to check for CPXML documents that might specify how to then handle the call, per block 624. If found, the CPXML documents can be parsed and processed, per block 626. If none exist, ring-not-answered (RNA) forwarding rules or ONA rules are then applied, per block 628.

If the call is internal, then the call processing engine checks whether CPXML is enabled for the particulars of the call, per block 610. For example, CPXML documents can be enabled based upon the customer account associated with the called number (e.g., as indicated by the DID number or extension). If CPXML is not enabled, a route rule engine can be invoked, per block 612. The call control engine next determines whether or not there are any special call processing rules to implement, per block 616. If not, then the call can be routed without further processing. If so, then the corresponding call processing rule(s) can be invoked, per block 618. The call processing rules might include, for example, specialized routing rules that route the call to different destinations depending upon the status of an endpoint specified by called number. This might include call forwarding that is always implemented, or that is implemented when a destination line is busy or subject to a network outage that renders the corresponding endpoint device unreachable.

According to various embodiments of the present disclosure, the call control engine can use CPXML commands to control the processing of the call, per block 614. As discussed herein, the source of the documents with the CPXML commands can vary according to the particular implementation.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (VOIP) endpoint device (or endpoint) includes a communication circuit and (computer) processing circuits which are configured to establish (VoIP) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims

What is claimed is:

1. A data communications system comprising:
    a plurality of data communications servers and a Platform as a Service (PaaS) interface to provide data communications services including
        routing data communications involving each of a plurality of customer accounts according to communications routing instructions received on behalf of each customer account,
        for a certain customer account from among the plurality of customer accounts,
            monitoring, tracking and analyzing the routed data communications,
            generating and storing in a database, based on the analyzing, statistics of the routed data communications, the statistics including different parameters characterizing the routed data communications,
            receiving a set of data processing instructions associated with the certain customer account, the set of data processing instructions being written using one or both of a programming language and one or more scripted documents to provide data communications flow commands and communications routing instructions, and to provide requests for selected aspects of the statistics, and
            providing access, for review by a user associated with the certain customer account, to certain data in the database by communicating with a customer server associated with the customer account without the user directly accessing the database.

2. The data communications system of claim 1, wherein the different parameters correspond to or include one or more of: durations of the routed data communications, dates of the routed data communications, times of the routed data communications, parties contacted via the routed data communications, and endpoint devices contacted via the routed data communications.

3. The data communications system of claim 1, wherein the different parameters correspond to or include one or more of: selected data centers for the routed data communications, selected carriers for the routed data communications, certain of the routed data communications that are dropped, certain of the routed data communications that are transferred, and accessed ones of certain of the routed data communications that are recorded via voicemail.

4. The data communications system of claim 1, wherein the plurality of data communications servers and the PaaS interface are to receive one or more data sources on behalf of one of the plurality of the customer accounts without providing direct access to data in the one or more data sources.

5. The data communications system of claim 1, wherein the plurality of data communications servers and the PaaS interface are to receive one or more data sources operated on behalf of one of the plurality of the customer accounts, by receiving a Uniform Resource Identifier (URI) that indicates how the one or more data sources are to be accessed.

6. The data communications system of claim 1, wherein the plurality of data communications servers and the PaaS interface are to receive one or more data sources operated on behalf of one of the plurality of the customer accounts, by using certain of the set of data processing instructions, wherein said certain of the set of data processing instructions indicate how the one or more data sources are to be accessed.

7. The data communications system of claim 1, wherein said providing access includes receiving and responding to queries received on behalf of the certain customer account.

8. The data communications system of claim 1, wherein the set of data processing instructions are written using a programming language.

9. The data communications system of claim 1, wherein the set of data processing instructions are written using one or more scripted documents.

10. The data communications system of claim 1, wherein said providing access includes receiving and responding to one or more queries received on behalf of the certain customer account, wherein said one or more queries identify a data source and a conditional response based upon results or responses to said one or more queries.

11. The data communications system of claim 1, wherein the plurality of data communications servers provides VoIP (Voice over Internet Protocol) communications services, and the PaaS interface is to be configured by or on behalf of a services-provider entity to provide the data communication services as indicated for each of the plurality of customer accounts.

12. The data communications system of claim 1, wherein the PaaS interface is to be changed without requiring modification data received on behalf of the certain customer account.

13. The data communications system of claim 1, wherein the set of data processing instructions are written using a programming language that includes a scripting language.

14. The data communications system of claim 1, wherein the set of data processing instructions are written using a programming language that includes an XML-type language.

15. A method for use in a data communications system having a Platform as a Service (PaaS) interface and a plurality of data communications servers, the method comprising:
providing, via the plurality of data communications servers and the PaaS interface, data communications services including
routing data communications involving each of a plurality of customer accounts according to communications routing instructions received on behalf of each customer account,
for a certain customer account from among the plurality of customer accounts,
monitoring, tracking and analyzing the routed data communications,
generating and storing in a database, based on the analyzing, statistics of the routed data communications, the statistics including different parameters characterizing the routed data communications,
receiving a set of data processing instructions associated with the certain customer account, the set of data processing instructions being written using one or both of a programming language and one or more scripted documents to provide data communications flow commands and communications routing instructions, and to provide requests for selected aspects of the statistics, and
providing access, for review by a user associated with the certain customer account, to certain data in the database by communicating with a customer server associated with the customer account without the user directly accessing the database.

16. The method of claim 15, wherein the PaaS interface provides the user associated with the certain customer account with access to one or more of the following: telephone call routing control, PBX functions, computer telephony integration (CTI), and data analytics.

17. The method of claim 15, wherein the database includes call summary metrics corresponding to the different parameters of the routed data communications.

18. The method of claim 15, wherein the set of data processing instructions are written and documented via the programming language and include data communications flow commands and communications routing instructions.

19. A method comprising:
via a data communications system having a Platform as a Service (PaaS) interface and a plurality of data communications servers, providing
data communications services including routing data communications involving each of a plurality of customer accounts according to communications routing instructions received on behalf of each customer account,
for a certain customer account from among the plurality of customer accounts,
monitoring, tracking and analyzing the routed data communications,
generating and storing in a database, based on the analyzing, statistics of the routed data communications, the statistics including different parameters characterizing the routed data communications,
receiving a set of data processing instructions associated with the certain customer account, the set of data processing instructions being written using one or both of a programming language and one or more scripted documents to provide data communications flow commands and communications routing instructions, and to provide requests for selected aspects of the statistics, and
providing access, for review by a user associated with the certain customer account, to certain data in the database by communicating with a customer server associated with the customer account without the user directly accessing the database.

20. The method of claim 19, further including controlling data communications routed for each customer account by communicating with a customer server associated with the customer account without directly accessing certain customer data stored on the customer server, and based on a respective set of one or more data processing instructions associated with the customer account.

* * * * *